UNITED STATES PATENT OFFICE.

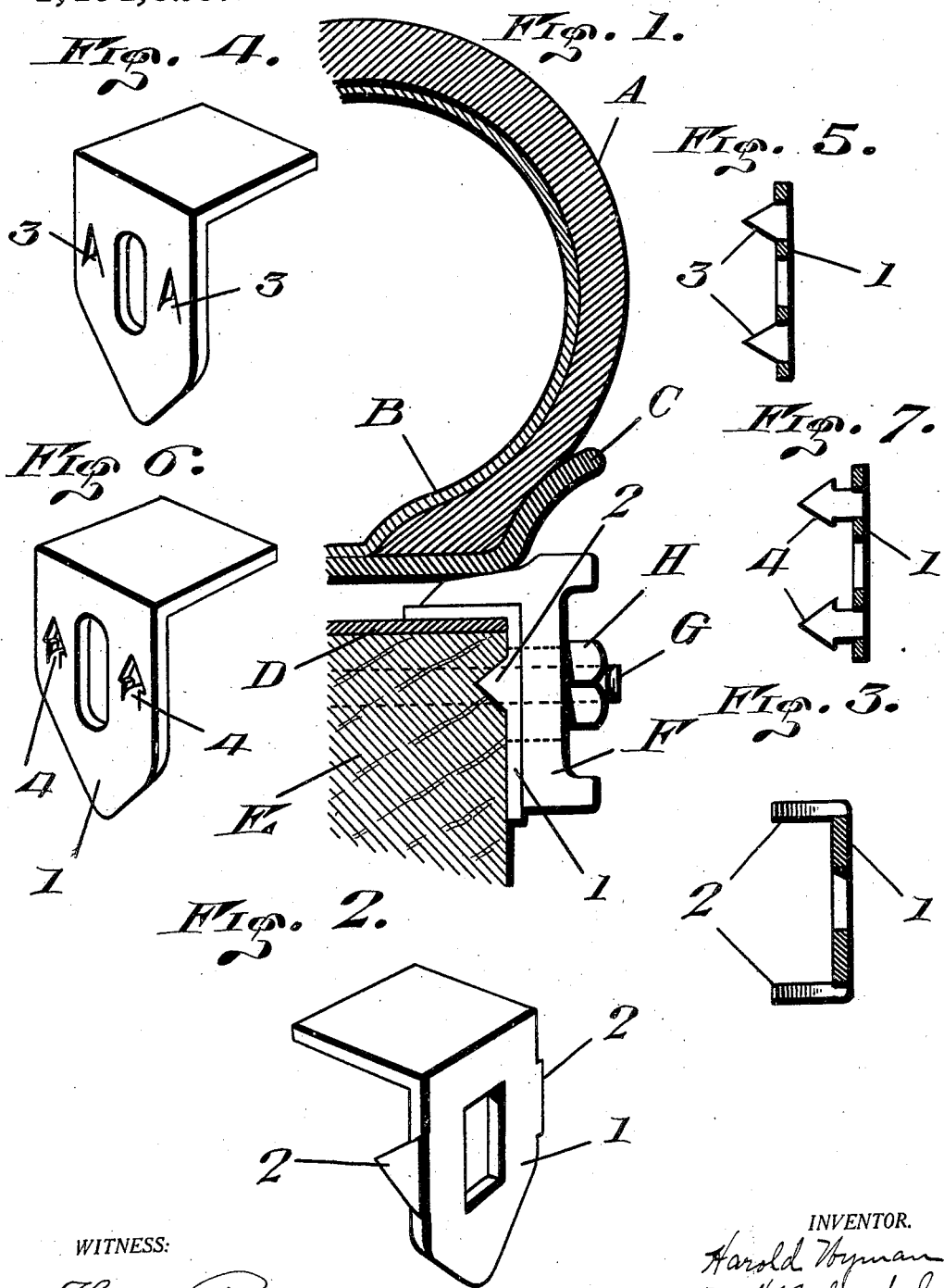

HAROLD WYMAN, OF PLANTSVILLE, CONNECTICUT.

SHIM.

1,404,825. Specification of Letters Patent. Patented Jan. 31, 1922.

Application filed November 20, 1919. Serial No. 339,317.

*To all whom it may concern:*

Be it known that I, HAROLD WYMAN, a citizen of the United States, residing at Plantsville, in the county of Hartford and State of Connecticut, have invented certain new and useful Improvements in Shims, of which the following is a specification.

This invention relates to shims especially intended for use in connection with bolted lugs for use in holding the demountable rims of automobile wheels in position on said wheels, and has for its object to provide a device which may be readily applied, which will not need to be removed or in any manner disturbed after once being forced into position, which will compensate for the wear of the lugs, which will be cheap to manufacture, and which will be easily applied, all as hereinafter set forth, described and claimed.

In the accompanying drawings:

Figure 1 represents a sectional view, broken away, of a felly, felly band, demountable rim and tire, in their normal relation, with a shim embodying my invention applied to said felly and extending between the lateral face of the latter and the usual lug, and between the felly band and the operative arm of the lug;

Figure 2, a detail perspective view of the shim;

Figure 3, a sectional view of the shim on line 3—3 of Figure 2 looking in the direction of the arrow;

Figure 4, a view, similar to Fig. 2, of a modified form of shim;

Figure 5, a sectional view on the line 5—5 of Figure 4, looking in the direction of the arrow;

Figure 6, a view, similar to Figure 4, of a further modified form of shim; and

Figure 7, a sectional view on the line 7—7 of Figure 6, looking in the direction of the arrow.

Referring now in detail to the drawings, A indicates the pneumatic tire, B the inner tube, C the usual demountable rim, D the felly band, E the felly, F one of the usual securing lugs having the operative arm provided with an inclined or beveled radially outer face, and the long or vertical arm provided with a long slot receiving one of the securing bolts G and permitting radial movement of the lug when being tightened up and also permitting application to different wheels in which the securing bolts G are at varying distances, radially, from the felly band, and H indicates one of the usual nuts turning on the threaded ends of the respective bolts G and bearing against the outer faces of the respective lugs F to force their operative arms in between the felly band and demountable rim and forcing the latter away from the felly band as the said operative arms are forced inward between said felly band and demountable rim, all as is well known.

After continued use the inclined faces of the operative arms of the lugs F become worn or dished out slightly and then even when forced in until the inner faces of their long arms lie flat against the side of the felly they will not spread the demountable rim sufficiently and will not engage it with a sufficient frictional grip, with the result that the wheel will squeak, and, of more importance, the demountable rim will creep around the wheel, resulting in loss of traction and, to a limited degree, of control of the car, and also resulting in a great increase in the wear on both the lugs and the demountable rim.

To compensate for this wear I provide a shim 1, having substantially the same angular shape, and of substantially the same size in outline, but not in thickness, and I provide the long arm of this shim with a long slot to receive the end portion of bolt G for the same reasons above given, that the lug itself is provided with a slot. The radially outer face of the operative arm of the shim 1 may be flat, as shown, though it need not be necessarily formed thus, nor used in such shape.

This shim is to be preferably stamped from sheet metal of proper and substantial weight, durability, and thickness, and is provided on each side edge with a point or lug 2, bent at right angles to the long arm, integral therewith and adapted to be forced into the wood of the felly by the action of the nut H in forcing the lug F into proper position. Of course this shim 1 may be hit with a hammer if desired to drive the points or lugs 2 into the wood of the felly independently of the action of the nut H.

This shim 1 has a short arm, which, in arranged position on the felly, lies between the felly band or felly and the operative arm of its lug F with the result that the said operative arm of the lug F is spaced radially outward away from the felly band or felly by just the thickness of the short arm of the shim, thus compensating for the wear in the beveled face of the operative arm of the lug F.

The points or lugs 2 penetrating into the wood of the felly will hold it thereto permanently so that the lug F may be readily removed to permit the change of a tire without disturbing the shim 1 in any manner.

In the modification illustrated in Figures 4 and 5 the lugs 3 running with the grain of the wood of the felly are substituted for the lugs 2 of the preferred form, to save metal and get a better grip or hold in the felly.

In the modification shown in Figures 6 and 7 the arrow-point shape lugs 4 are substituted for the lugs 3 of the form shown in Figures 4 and 5.

It is obvious that other forms may be employed and retain the fundamentals of the above described invention, also that other materials than sheet metal may be employed, though the forms shown and the material mentioned are preferred.

Having thus described my invention, what I claim as new and desire to secure by Letters Patent is:

1. A shim adapted to be slipped over the screw-threaded end of a securing bolt of the usual demountable rim automobile wheel and having a portion, in arranged relation on the wheel, lying between the outer peripheral face of the felly and the inner radial face of the wedge lug mounted on said bolt, said shim being provided with means for penetrating into said felly to hold said shim permanently to said felly independently of said lug.

2. A shim having a portion adapted to lie, in arranged relation on the wheel, between the outer peripheral face of the felly and the radially inner face of the usual securing lug, and means penetrating into a part of the wheel to hold said shim permanently in such position independently of said lug.

3. A shim adapted to be slipped over the screw-threaded end portion of a securing bolt of the usual demountable rim automobile wheel and having a portion, in arranged relation on the wheel, lying between the outer peripheral face of the felly and the inner radial face of the wedge lug mounted on said bolt, said shim being provided with integral means for penetrating laterally into said felly to hold said shim permanently thereto independently of said lug.

4. A shim stamped or otherwise formed out of sheet metal, adapted to be slipped over the screw-threaded end portion of a securing bolt of the usual demountable rim automobile wheel, having a portion, in arranged relation on the wheel, lying between the outer peripheral face of the felly and the inner radial face of the wedge lug mounted on said bolt, and provided with integral lugs extending transversely of the wheel and also peripherally thereof in order to extend in the direction of the grain of the felly, and adapted to be driven into said felly by force applied to the shim in the direction of the lateral face of said felly adjacent to said shim.

5. A shim adapted to be slipped over the screw-threaded end portion of a securing bolt of the usual demountable rim automobile wheel and having a portion, in arranged relation on the wheel, lying between the outer peripheral face of the felly and the inner radial face of the wedge lug mounted on said bolt, said shim being provided with integral shouldered means for penetrating laterally into said felly to hold said shim permanently thereto independently of said lug.

In testimony whereof I have signed my name to this specification in the presence of two subscribing witnesses.

HAROLD WYMAN.

Witnesses:
WARREN D. CHASE,
HELEN E. FINNEGAN.